United States Patent
Göllü

(10) Patent No.: US 7,321,305 B2
(45) Date of Patent: *Jan. 22, 2008

(54) SYSTEMS AND METHODS FOR DETERMINING A LOCATION OF AN OBJECT

(75) Inventor: Aleks Göllü, El Cerrito, CA (US)

(73) Assignee: PINC Solutions, Berkeley, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 11/175,081

(22) Filed: Jul. 5, 2005

(65) Prior Publication Data

US 2007/0018811 A1    Jan. 25, 2007

(51) Int. Cl.
G08B 13/14     (2006.01)
G06F 17/00     (2006.01)
G06Q 10/00     (2006.01)

(52) U.S. Cl. .................. 340/572.1; 340/10.1; 340/5.92; 340/505; 700/215; 700/216; 705/28

(58) Field of Classification Search .................. None
See application file for complete search history.

(56) References Cited

U.S. PATENT DOCUMENTS

| | | |
|---|---|---|
| 3,070,796 A | 12/1962 | Gray |
| 5,889,474 A | 3/1999 | LaDue |
| 6,028,514 A | 2/2000 | Lemelson et al. |
| 6,043,873 A | 3/2000 | Ramer et al. |
| 6,204,764 B1 | 3/2001 | Maloney |
| 6,323,898 B1 | 11/2001 | Koyanagi et al. |
| 6,327,533 B1 | 12/2001 | Chou |
| 6,333,690 B1 | 12/2001 | Nelson et al. |
| 6,380,732 B1 | 4/2002 | Gilboa |
| 6,388,612 B1 | 5/2002 | Neher |
| 6,449,486 B1 | 9/2002 | Rao |
| 6,499,025 B1 | 12/2002 | Horvitz et al. |
| 6,522,266 B1 | 2/2003 | Soehren et al. |

(Continued)

FOREIGN PATENT DOCUMENTS

EP     1 134 555 A1     9/2001

(Continued)

*Primary Examiner*—Julie Bichngoc Lieu
(74) *Attorney, Agent, or Firm*—Kirkpatrick & Lockhart Preston Gates Ellis LLP

(57) ABSTRACT

A system for determining a location of an object. The system includes an object location tracker and a computer system. The object location tracker is configured for attachment to a mobile vehicle and includes an object identification reading device and a position-tracking device. The object identification reading device senses object identification indicia on the object, such as RF ID tags, bar codes, etc., as the mobile vehicle moves around an environment in which the object is situated. The position-tracking device computes the location of the object location tracker as the mobile vehicle moves throughout environment. The computer system associates the sensed object identification indicia of the object, as determined by the reading device, with a location in the environment based on the position of the object location tracker in the environment, as determined by the position-tracking device, when the reading device senses the object identification indicia. The mobile vehicle may include its own mobility system, such as a forklift or an autonomous robotic device, or the mobile vehicle may be, for example, a pushcart that is pushed around the environment.

23 Claims, 8 Drawing Sheets

U.S. PATENT DOCUMENTS

| | | |
|---|---|---|
| 6,529,164 B1 | 3/2003 | Carter |
| 6,567,116 B1 | 5/2003 | Aman et al. |
| 6,600,418 B2 * | 7/2003 | Francis et al. ........... 340/572.1 |
| 6,611,757 B2 | 8/2003 | Brodie |
| 6,653,937 B2 | 11/2003 | Nelson et al. |
| 6,657,584 B2 | 12/2003 | Cavallaro et al. |
| 6,687,386 B1 | 2/2004 | Ito et al. |
| 6,693,585 B1 | 2/2004 | MacLeod |
| 6,700,493 B1 | 3/2004 | Robinson |
| 6,700,533 B1 | 3/2004 | Werb et al. |
| 6,705,526 B1 | 3/2004 | Zhu et al. |
| 6,721,657 B2 | 4/2004 | Ford et al. |
| 6,735,523 B1 * | 5/2004 | Lin et al. .................... 701/216 |
| 6,833,811 B2 | 12/2004 | Zeitfuss et al. |
| 6,834,251 B1 | 12/2004 | Fletcher |
| 6,838,992 B2 | 1/2005 | Tenarvitz |
| 2001/0004601 A1 | 6/2001 | Drane et al. |
| 2001/0008561 A1 | 7/2001 | Paul et al. |
| 2001/0046309 A1 | 11/2001 | Kamei |
| 2002/0070862 A1 | 6/2002 | Francis et al. |
| 2002/0090955 A1 | 7/2002 | Nelson et al. |
| 2002/0109597 A1 | 8/2002 | Nelson et al. |
| 2002/0128775 A1 | 9/2002 | Brodie et al. |
| 2002/0145520 A1 | 10/2002 | Maloney |
| 2002/0167594 A1 | 11/2002 | Sumi et al. |
| 2002/0193900 A1 | 12/2002 | Kinoshita et al. |
| 2003/0035051 A1 | 2/2003 | Cho et al. |
| 2003/0102974 A1 | 6/2003 | Allen |
| 2003/0109988 A1 | 6/2003 | Geissler et al. |
| 2003/0120448 A1 | 6/2003 | Moriya et al. |
| 2003/0132835 A1 | 7/2003 | Lin et al. |
| 2003/0135327 A1 | 7/2003 | Levine et al. |
| 2003/0142210 A1 | 7/2003 | Carlbom et al. |
| 2003/0146835 A1 | 8/2003 | Carter |
| 2003/0151500 A1 | 8/2003 | Mitsui |
| 2003/0210143 A1 | 11/2003 | Haddad |
| 2004/0008120 A1 | 1/2004 | Duncan et al. |
| 2004/0036600 A1 | 2/2004 | Lynch-Strozier et al. |
| 2004/0066329 A1 | 4/2004 | Zeitfuss et al. |
| 2004/0125984 A1 | 7/2004 | Ito et al. |
| 2004/0149036 A1 | 8/2004 | Foxlin et al. |
| 2004/0150560 A1 | 8/2004 | Feng et al. |
| 2004/0183682 A1 | 9/2004 | Tenarvitz |
| 2004/0186357 A1 * | 9/2004 | Soderberg et al. .......... 600/300 |
| 2004/0192352 A1 | 9/2004 | Vallstrom et al. |
| 2005/0001814 A1 | 1/2005 | Anton et al. |
| 2005/0018879 A1 | 1/2005 | Ito et al. |
| 2006/0176174 A1 | 8/2006 | Göllü et al. |
| 2006/0187028 A1 | 8/2006 | Kiang et al. |

FOREIGN PATENT DOCUMENTS

| | | |
|---|---|---|
| EP | 1 262 789 A2 | 12/2002 |
| WO | WO 2004/001337 A1 | 12/2003 |

\* cited by examiner

SYSTEMS AND METHODS FOR DETERMINING A LOCATION OF AN OBJECT

CROSS-REFERENCE TO RELATED APPLICATIONS

The present application is related to U.S. patent application Ser. No. 11/054,905, entitled "Position-Tracking Device for Position Tracking System," and U.S. patent application Ser. No. 11/054,881, entitled "Position-Tracking System," both of which were filed on Feb. 10, 2005.

BACKGROUND OF THE INVENTION

This application discloses an invention that is related, generally and in various embodiments, to systems and methods for determining a location of an object. The disclosed invention may be utilized to track the respective locations of any number of objects.

Position-tracking systems seek to identify the location of mobile objects in real-time and are used in a wide variety of applications, including transportation, logistics management, healthcare, security, etc. Position-tracking systems that can provide continuous location information are desirable for applications that require non-interrupted visibility of the mobile object through a journey. For objects that are moved with a vehicle (such as inter-modal shipping containers or trailers), being able to locate the position of the objects in real-time can help improve the efficiency of supply-chain and inventory management while reducing the loss in productivity of assets. As businesses increasingly depend on a global supply chain and distribution networks, more goods and assets are being moved around for longer distances and with more parties involved in the process. In order to facilitate an automated, error-free data exchange for logistics management, the availability of continuous information about these assets in real-time is more valuable than "discrete" information that is only available for certain regions, albeit with perhaps higher position resolution.

Existing position-tracking systems typically employ satellite, radio wave or other wireless technologies. However, such systems typically suffer from limitations caused by line-of-sight requirements for location signals and/or interference caused by the environment in which they operate (e.g., multi-path fading or radio waves in an indoor setting). In addition, although much effort has gone into extending the operating range for Global Positioning System (GPS) and GPS-like technologies with more and more sophisticated software implementations, GPS systems alone are still generally ineffective and unreliable for location tracking indoors or in other environments where obstructions to the satellite signals present challenges. Further, other non-GPS based position technologies that have been proposed to date are largely based on a "local GPS" system using an assembly of locally deployed wireless antennas to mimic the function of the GPS satellites. Due to the high cost of designing and implementing such systems, however, they remain a costly proposition

SUMMARY

In one general respect, this application discloses a system for determining a location of an object. According to various embodiments, the system includes an object location tracker and a computer system. The object location tracker is configured for attachment to a mobile vehicle and includes an object identification reading device and a position-tracking device. The object identification reading device senses object identification indicia on the object, such as RF ID tags, bar codes, etc., as the mobile vehicle moves around an environment in which the object is situated. The position-tracking device computes the location of the object location tracker as the mobile vehicle moves throughout environment. The computer system associates the sensed object identification indicia of the object, as determined by the reading device, with a location in the environment based on the position of the object location tracker in the environment, as determined by the position-tracking device, when the reading device senses the object identification indicia. The mobile vehicle may include its own mobility system, such as a forklift or an autonomous robotic device, or the mobile vehicle may be, for example, a pushcart that is pushed around the environment. Also, the mobile vehicle may be a person walking around.

The position-tracking device may provide variable-resolution position information for the mobile vehicle based on the environment in which the vehicle is moving. For example, while in a "wide resolution" area where very high position resolution is not required, the system may compute a general position for the vehicle based on a wireless telephone network Cell-ID/map correlation architecture. That is, the system may utilize Cell-ID information obtained from a wireless telephone network in conjunction with a database of area maps to determine a general position of the vehicle (e.g., within the geographic area covered by a certain Cell-ID). In this case, the position tracking system is said to operate in the "wide area" mode.

When the vehicle enters an area (such as a facility, warehouse, campus, etc.) where greater position resolution is required (a so-called "high resolution area"), the position tracking system may transition to a corresponding high-resolution mode. The mode transition may be activated, for example, by a wireless activation signal provided at the ingress of the high-resolution area. The greater position resolution may be realized using other wireless signals, from a wireless aiding system within the high-resolution environment, combined with the inputs from the inertial sensors. The wireless aiding system can consist of a number of objects with known fixed positions with identification indicia that are read. The position-tracking device may compute the amount of displacement in the longitudinal, latitudinal and attitudinal directions based on the measurements from the inertial sensors. When aided by the wireless reference position signals from the wireless aiding system, the combined implementation can provide enhanced accuracy (e.g., on the order of meters) without ever losing coverage of the vehicle, regardless of the layout of the high-resolution environment. When the mobile vehicle exits the high-resolution area, the wireless activation signal at the point of egress may deactivate the high-resolution mode and the system may automatically revert back to the wide area mode.

For vehicle tracking in the high-resolution mode, the system may exploit distinct patterns of motion that can be identified as motion "signatures" that are characteristic of certain types of motion. The position tracking system may estimate the state of the vehicle (e.g., the heading, position, velocity of the vehicle) based on kinematic models for the current mode of the vehicle. Adaptive and cascaded Kalman filtering or similar techniques, for example, may be employed in the analysis to more accurately estimate the position and velocity of the vehicle based on the motion pattern identified.

The state history of the vehicle may be stored and used in the state estimate computation to make continuous adjustments to the state estimates in the past. For instance, the inertial sensor measurements and a priori estimations for a configurable time period at a configurable frequency may be stored in a data storage device. As new information becomes available, the a priori estimations may be adjusted to provide more accurate final estimations (with a time delay). For example, when the tracking system determines that the vehicle has become "stationary" based on an identified match to a motion signature, any residual estimated velocity may be corrected (or, smoothed) backwards in time to provide an improved velocity and, hence, position estimations from the original calculation. Alternatively, one can store state history between the sighting of two objects with fixed known positions and then calculate a trajectory that passes through both of them.

The computer system may maintain a centralized, real-time record of the locations of the objects identified by the reading device. The record can be stored in a database and/or it may be a direct input to a logistic or other IT management system so that the location information can be further processed or utilized by other applications These and other aspects of the present invention will be apparent from the description to follow.

DESCRIPTION OF THE FIGURES

Various embodiments of the disclosed invention will be described herein by way of example in conjunction with the following figures, wherein.

DETAILED DESCRIPTION OF THE INVENTION

Figure 1:
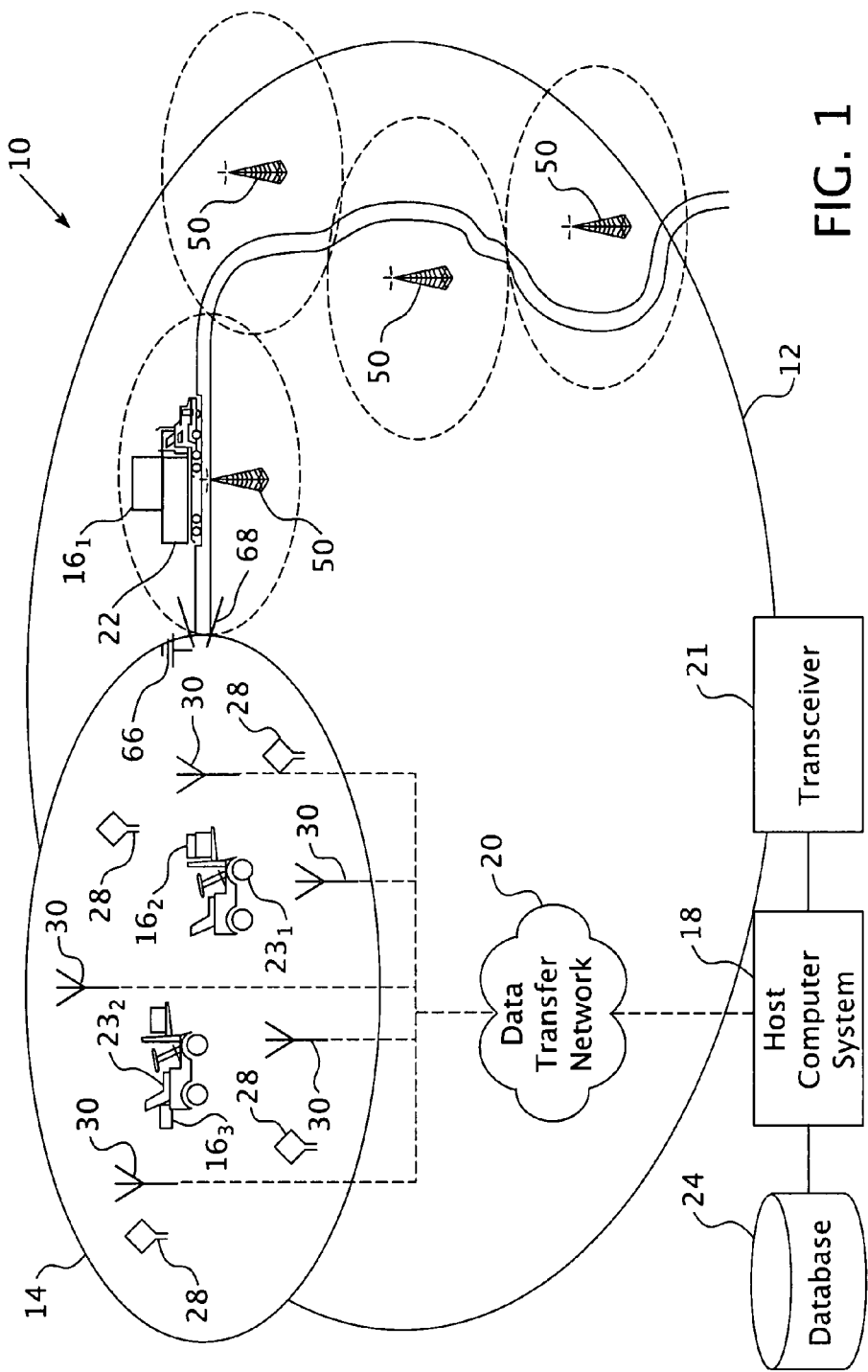
FIG. 1 is a diagram of a position tracking system for tracking the position of an object according to various embodiments of the disclosed invention.

FIG. 1 is a diagram of a position-tracking system 10 according to various embodiments of the disclosed invention for tracking the position of one or more mobile objects in real-time (i.e., within a small response time) as the objects travel about. The tracked objects may be any tangible object that is capable of moving, whether by its own mobility system or because it is capable of being transported by other means, such as conveyor belts, vehicles, lifts, persons, etc. Accordingly, the tracked objects may be goods, containers or supports for goods, vehicles or equipment for moving goods, etc. Also, the tracked objects or goods may or may not have RF ID tags. That is, the position tracking system described herein may be used in conjunction with RF ID technology or in lieu of it.

The tracking system 10 tracks the position of the objects as they travel through areas, such as area 12, where very high position location resolution is not needed, and areas, such as area 14, where high position resolution is needed. "Wide resolution" areas may include areas where the objects are in transit between locations such as, for example, intermodal transportation hubs, shipyards, rail yard, etc. In such areas, position resolution on the order of hundreds or thousands of meters may be acceptable. On the other hand, "high resolution" areas, whether indoor or outdoor environments, are areas that require more precise location information for logistical purposes, such as on the order of a few meters or less. Examples of high-resolution areas include manufacturing facilities, campuses, warehousing facilities, etc.

The position-tracking system 10 may include, according to various embodiments, one or more tracking devices 16 and a host computer system 18 that communicates with the tracking devices 16. The tracking devices 16 may be attached or otherwise connected to the objects to be tracked, for example. In FIG. 1, three tracking devices $16_{1-3}$ are shown, one attached to a truck 22 traveling in the wide-resolution area 12, a second connected to goods on a first forklift $23_1$ in the high-resolution area 14, and a third connected to a second forklift itself $23_2$. It should be recognized that the tracking devices 16 could be attached or otherwise connected to other types of vehicles, goods, containers for the goods, equipment, etc. For example, tracking devices 16 could be connected to mobile assets (e.g., goods), such as the tracking device 162 in FIG. 1, or to equipment (e.g., forklifts) that are used to move mobile assets around a facility, such as the tracking device $16_3$ in FIG. 1. By tracking the location of equipment, for example, the location of object/goods that are not capable of moving by themselves can be effectively tracked in certain applications, as long as information on which object(s) is associated with the tracked equipment at any given time is available. Also, the tracking system 10 may track a greater number of objects than the two shown in FIG. 1.

The tracking devices 16 preferably include processing capabilities that allow them to estimate their real-time position based on, for example, inertial sensor inputs and wireless signals. The tracking devices 16 may operate in one of two modes—a wide area mode and a high-resolution mode—and compute their estimated position differently depending on its mode of operation. For example, when a tracking device 16 is in the high-resolution area 14 (such as connected to goods on the forklift $23_1$ or connected to the forklift $23_2$ itself), the tracking device 16 may correspondingly be in its high-resolution mode and compute its estimated position with an accuracy on the order of a few meters or less based on the input from inertial sensors and wireless signals from a wireless aiding system. The wireless aiding system may include, as shown in FIG. 1, one or more reference point transmitters 28 for providing a reference location to the tracking device 16. When the tracking device 16 is in the wide resolution area 12 (such as connected to goods or containers on the truck 22), it may correspondingly be in the wide area mode and its estimated position in this mode may have less resolution, such as on the order of hundreds or thousands of meters. Such a dual resolution mode approach may be satisfactory in position tracking applications where highly accurate position information is not needed in the wide resolution areas but is needed in other environments. Indeed, the dual mode approach may be preferable because it does not require the wireless location aiding system for the high-resolution area to be built out in the wide resolution areas.

The tracking device 16 may transmit its estimated position to the host computer system 18. This may be done continuously, periodically, randomly, pseudo-randomly, and/or upon a request from the host computer system 18. The host computer system 18 may maintain a centralized, real-time record of the locations of the tracked objects. The record can be stored in a database 24 and/or it may be a direct input to a logistic or other IT management system so that the location information can be further processed or utilized by other applications.

The host computer 18 may be implemented as one or a number of networked computers, such as servers, PCs, workstations, etc. In various embodiments, as described above, the tracking device 16 may compute its estimated position and transmit the position to the host 18, although according to other embodiments, the position determination processing may be distributed between the processing capabilities of the tracking device 16 and the host 18. Also, although only three tracking devices 16 is shown in FIG. 1, it should be recognized that at any one time the host computer system 18 may be in communication with a fewer or greater number of tracking devices. Further, the host computer system 18 may control and monitor the tracking devices 16 via control and monitoring signals sent to the tracking devices 16.

The wireless aiding system used in the high-resolution area 14 may include a number of reference point transmitters 28 positioned throughout the high-resolution area 14. Each reference point transmitter 28 may wirelessly transmit a high accurately reference location position to the tracking devices 16, such as with RF, acoustic, optical, IR or other suitable signals, such that the tracking devices 16 can compute their position based on the reference as well as with input from inertial sensors, as described in more detail below. The high-resolution areas 14 may also include a number of radio access points 30. The radio access points 30 may provide a wireless gateway (e.g., via the IEEE 802.11 or IEEE 802.15.4 protocols) for communications between the position tracking devices 16 and the host computer system 18. The radio access points 30 may be in communication with the host 18 via a data transfer network 20 such as, for example, a LAN, a corporate intranet, a WAN, a MAN, a TCP/IP network, a broadband computer network, a wireless communication network, or a combination of one or more of these data transfer networks.

The reference point transmitters 28 and the radio access points 30 may be strategically placed throughout the high-resolution area 14 so as to avoid interference caused by obstructions in the environment and/or co-channel interference, yet reduce the number of each that is needed to provide adequate position resolution and communications with the host 18. For example, in various applications it may be advantageous to position the reference point transmitters 28 points along or near common travel paths for the objects in the environment.

Figure 2:
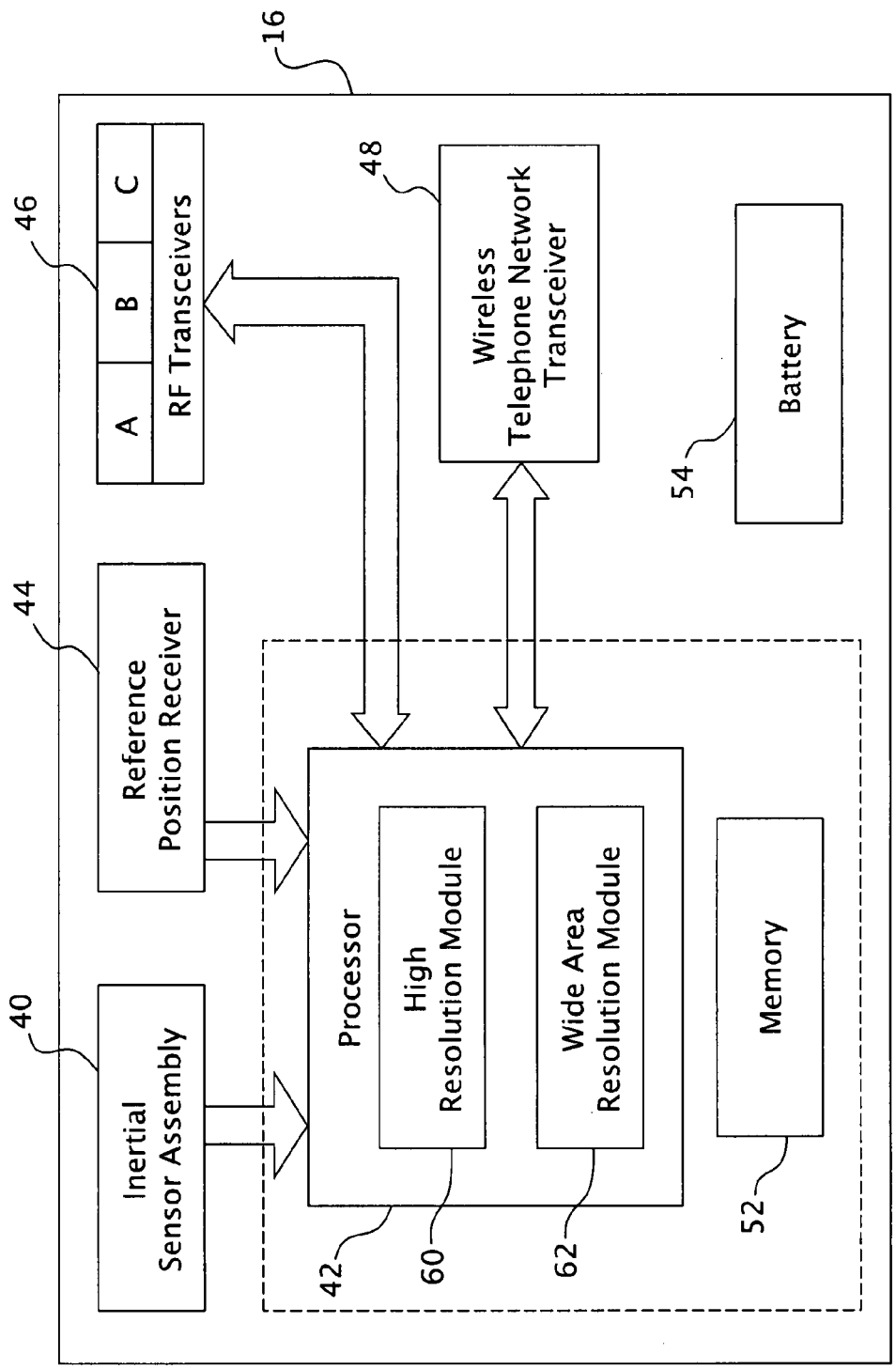
FIG. 2 is a block diagram of the tracking device of the system of FIG. 1 according to various embodiments of the disclosed invention.

FIG. 2 is a block diagram of a tracking device 16 according to various embodiments of the disclosed invention. In the high-resolution mode of operation, the tracking device 16 may compute its estimated position based on (1) inputs from a number of inertial sensors in an inertial sensor assembly 40 and (2) signals received by a reference position receiver 44 that are transmitted from the reference position transmitters 28 (shown in FIG. 1). The inertial sensor assembly 40 may detect movement by the tracking device 16, such as lateral, vertical or rotational movement, and provide corresponding data signal inputs to a processor 42. The inertial sensor assembly 40 may include a number of accelerometers (not shown) and/or gyroscopes (not shown) for detecting motion by the tracking device 16. For example, according to various embodiments, three accelerometers and three gyroscopes may be used, one for each or multiple degree(s) of freedom (x, y, z, roll, pitch, yaw) for the tracking device 16. According to other embodiments, a lesser or greater number of accelerometers and/or gyroscopes may be used. The accelerometers/gyroscopes may be, for example, micro-devices, such as MEMS-based devices. According to other embodiments, different types of inertial sensors may be used, such as optical-based inertial sensors. The processor 42 may include one or more microprocessors. For an embodiment where multiple processors are used, the tracking device 16 may employ parallel processing.

In addition to the processor 42 and the inertial sensor assembly 40, the tracking device 16 may include a reference position receiver 44, a number of RF transceivers 46A-C, and a wireless telephone network transceiver 48. The reference position receiver 44 may receive signals from the reference point transmitters 28 and forward the received reference position information to the processor 42 to aid in the position determination process. The RF transceiver 46A may communicate with the radio access points 30 and/or with other tracking devices 16. As such, the RF transceiver 46A may report object location information (as computed by the processor 42) back to the host 18 via the radio access points 30, as well as receive control and monitoring signals from the host 18 and send responses thereto.

The wireless telephone network transceiver 48 may communicate with a wireless telephone network that includes base stations 50 (see FIG. 1). Information from such communications may be used by the processor 42, as described below, in calculating the location information of the object in the wide area mode of operation. While in the wide resolution area 12, the tracking device 16 may communicate with the host 18 via, for example, satellite radio signals or other long-range radio communication signals sent from the RF transceiver 46B and received by a transceiver 21 associated with the host 18. According to other embodiments, the tracking device 16 may communicate with the host via a telephone network (not shown), such as the wireless telephone network associated with the base stations 50.

The tracking device 16 may also include a memory device 52 and a power source, such as battery 54. The memory device 52 may be in communication with the processor 42, and store instructions and data for the processor 42. The memory device 52 may be implemented, for example, as one or more RAM units or flash memory devices, or any other suitable memory device(s). The battery 54 supplies power to the various power-consuming components of the tracking device 16.

As shown in FIG. 2, the tracking device 16 may include a high-resolution module 60 and a wide area resolution module 62 for computing the position of the tracking device in the corresponding modes of operation. The modules 60, 62 may be implemented as software code to be executed by the processor 42 using any suitable computer instruction type such as, for example, Java, C, C++, Visual Basic, etc., using, for example, conventional or object-oriented techniques. The software code may be stored as a series of instructions or commands on a computer readable medium, such as a memory device 52.

A wireless signal transmitted from points of egress/ingress between the wide resolution areas 12 and the high-resolution areas 14, such as from a transmitter 66 at gate 68 in FIG. 1, may be used by the tracking device 16 to switch between the wide area mode and the high-resolution mode. That is, when the tracking device 16 receives the egress/ingress activation signal (via, e.g., the RF transceiver 46C), the tracking device 16 may switch its mode of operation, for example, from the high resolution mode to the wide area mode, or vice versa, depending on whether the tracking device is leaving or entering the high resolution area 14. A number of such transmitters 66, such as one for each point of egress/ingress, may be used. Also, according to other embodiments, the modes of the tracking device 16 may be manually toggled, such as with a bistable switch at the point of egress/ingress.

In the wide area mode, the tracking device 16 may determine its general position, according to various embodiments, based on cell-ID information received from the wireless telephone network base stations 50. That is, the tracking device 16 may be in communication with one of the base stations 50 of the wireless telephone network according to conventional call hand-off technology employed by the wireless telephone network and obtain the Cell-ID from the base station 50 in the hand-shake/registration communications with the base station 50. Each base station 50 may serve a certain geographic area (a "cell site"). The wide area resolution module 62 of the tracking device 16 may correlate the received Cell-ID information to map information stored in the memory device 52 to determine the general location of the tracking device 16 (e.g., within the geographic area covered by the base station 50). Thus, as the object travels between cell sites as it travels throughout the wide resolution area 12, the wide area resolution module 62 may update its position as it enters each new cell site based on the new Cell-ID information that it receives. The geographic area of a cell in a wireless telephone network typically ranges from hundreds to a few thousand meters. In such a scheme, the positioning resolution varies as the object moves from areas with higher base station densities to areas with lower base station densities.

Further, if there is pre-planned route information for the object and that information is available to the tracking system, that information can be used to further refine the location estimation. For example, if it is known that the object is to be transported on a truck on particular highway in a particular region, when the wide area resolution module 62 determines the object is in the region based on the received cell-ID, it may further refine its location estimation to be on or near the highway in the geographic region covered by the relevant base station 50. The pre-planned route information may be stored in the memory device 52 of the tracking device 16, or it may be stored in a memory unit associated with the host 18 (e.g., the database 24). In the later case, the host 18 may compute the refined location estimation based on the pre-planned route information.

According to yet other embodiments, the wide area resolution module 62 may reside with the host 18. In such an embodiment, the cell-site map information may be stored in the database 24 and the tracking device 16 may report back to the host 18 the Cell-ID information. The host 18 may then perform the correlation between the Cell-ID information and the cell-site map information to compute the general location of the tracking device 16.

According to other embodiments, instead of or in addition to using the Cell-ID information to compute the location of the object in the wide resolution areas 12, the tracking device 16 may include a GPS receiver (not shown) to aid in the location determination process. For an embodiment where both the Cell-ID information and the GPS information are used to track the object, the wide area resolution module 62 may use both inputs to verify the location of the object.

The high-resolution module 60 of the tracking device 16 may compute the location and orientation of the object based on the inertial sensor inputs and the inputs from the wireless aiding system. The inertial sensors may provide outputs that measure motions of the object, such as linear accelerations and rates of rotation. In the description to follow, the vector â is used to identify the measured x, y and z accelerations, and the vector • is used identify the x, y, and z rotation rates as measured by the inertial sensor assembly 40. The measurements of the sensors may be assumed to contain noises that can be represented by stochastic models such as:

(Measured Data)=(Sensor Bias)+(Scale Factor)×(Actual Data)+(Drift Rate)×(Time)

where "Sensor Bias" and "Drift Rate" are random variables with possible time-varying characteristics.

Figure 3:
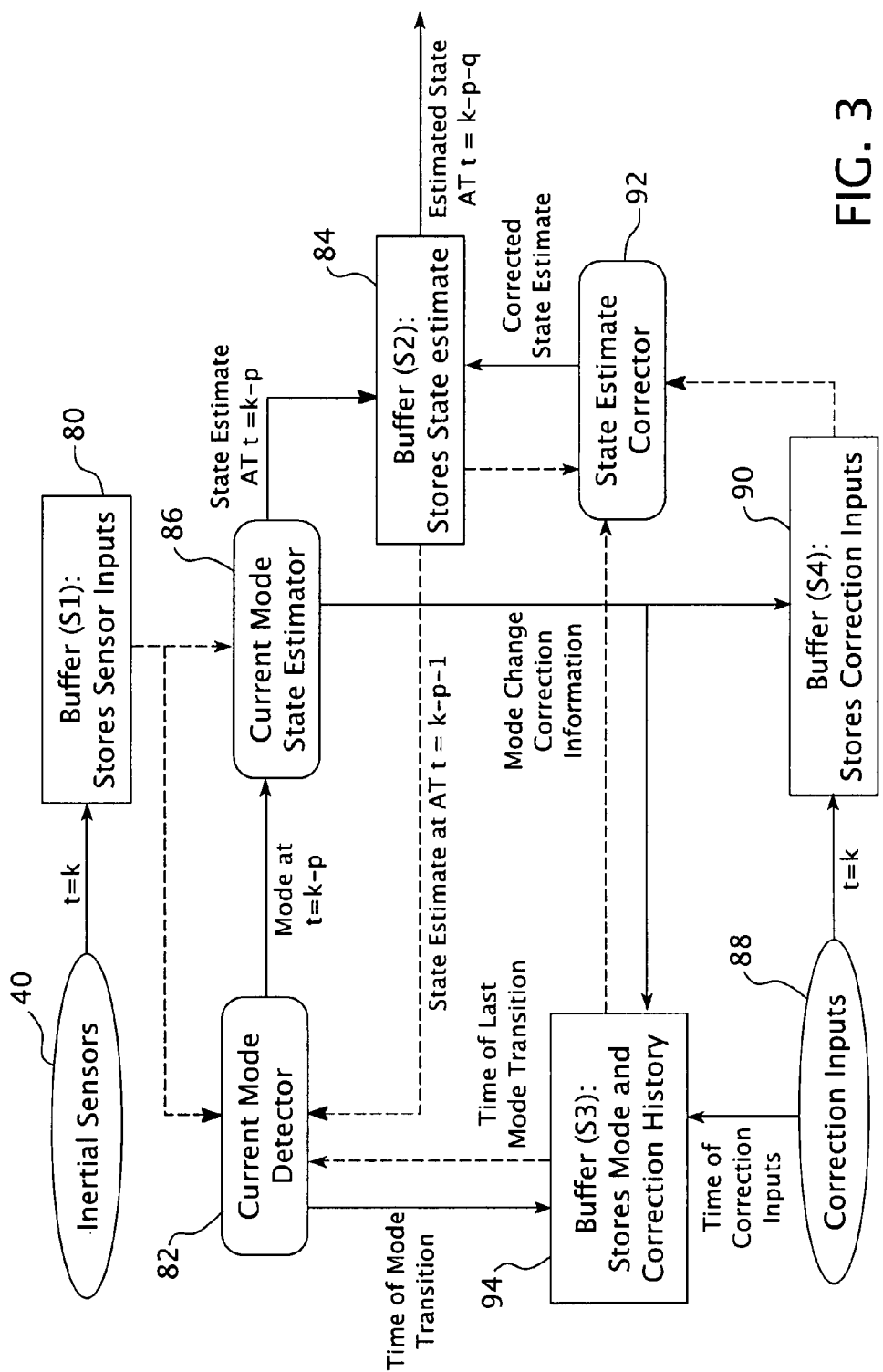
FIGS. 3-5 illustrate a process for computing the state estimate of the tracked object according to various embodiments of the disclosed invention.

FIG. 3 is a diagram of a state estimation algorithm employed by the high-resolution module 60 according to various embodiments of the disclosed invention to estimate the state of the tracked object in a high resolution area. For terminology purposes, three different frames of orientation are considered in describing the process: (1) the Inertial Frame, which is the coordinate frame of the tracking device 16, (2) the Body Frame, which is the coordinate frame of the object to which the tracking device 16 is affixed or connected, and (3) the Navigation Frame, which is the coordinate frame of the environment in which the object is moving. The "state" of the object computed by the high-resolution module 60 may include values for the following parameters (where vectors are denoted in lower case with an "^" and matrices are denoted in upper case with an "•"):

the position, $\hat{p}$, a vector representing the position of the object in the Body Frame;

the bias estimate, $\hat{b}$, a vector representing the bias in â and • (denoted as $\hat{b}^a$ and $\hat{b}^w$ respectively);

the alignment, $\vec{I}$, a rotation matrix that maps from the Body Frame to the Inertial Frame;

the attitude, $\vec{R}$, the rotation matrix that maps from the Navigation Frame to the Inertial Frame;

the active mode, m, a scalar representing the current mode of the object (e.g., stopped, moving in x, y, and/or z, etc.);

the velocity, $\hat{v}$, a vector representing the velocity of the object in the Navigation Frame; and the corrective state, $\vec{E}$, a matrix of correction factors.

In other embodiments, the state estimate may comprise a subset of these parameters.

Referring to FIG. 3, at block 80 the inputs from the inertial sensor assembly 40 (â and •) at time t=k are stored in a memory location (a buffer S1). At step 82, a current mode detector algorithm detects the current mode of the object, i.e., the mode at t=k−p, where p is a delay value, based on the inertial sensor inputs and the estimated state of the object at t=k−p−1 (stored in a buffer S2 at block 84). The current mode of the object may be a motion mode that is characterized by certain motion patterns or signatures indicative of the mode. For example, in the case of a car, one mode may be "moving forward," which may be characterized by a large acceleration in the x direction and lasting until a large deceleration. Another mode may be "stopped with the ignition off," which may be characterized by extremely small or no acceleration in the x, y or z direction, as well as extremely small or no rotation. The mode "stopped with the ignition on" may be characterized by slightly greater acceleration or rotation than the "stopped with the ignition off" mode, but still with relatively small acceleration and rotation measurements. Other modes, such as "turning," "moving backward," etc. may be defined, and such modes may be defined for different transportation modes (forklift, crane, carried by human, conveyor belt, etc.) The current mode of the object may be detected by matching the current motion signatures to the patterns of the defined modes. The current mode of the object may be used, as described below, in determining the location or state of an object because kinematic (or object movement) models may be constructed and used to define and/or limit the possible movements of the object when in a particular mode.

When the current mode detector 82 determines that there is a mode transition at time t=k, it stores the time point of the transition $t_m^i$ in a buffer S3 at block 94. The current mode detector 82 may also reference the buffer S3 to recall when the last mode transition occurred.

At step 86, a current mode state estimator algorithm computes the current state estimate of the object (i.e., state estimate at t=k−p) and the state estimate is written into the buffer S2 at block 84. As mentioned above, the "state" estimate of the object may include values for the parameters $\hat{p}$, $\hat{b}$, $\vec{I}$, $\vec{R}$, m, $\hat{v}$, and $\vec{E}$, or a subset of these parameters. As described in more detail below in conjunction with FIG. 5, the state estimate determination may be calculated based on the inertial sensor values (e.g., â and •), the mode of the object at t=k−p (as determined at step 82) and the state estimate at t=k−p−1 (stored in the buffer S2 at block 84). If there was a mode change, the correction information may associated with the mode change may be written to a buffer S4 at block 90. Also, if there is a correction resulting from a mode transition, the current mode state estimator 86 may write into the buffer S3 at block 94 that a correction was available at time t=k, which is stored as time $t_g^i$.

Available correction inputs 88 at time t=k, such as external correction inputs available from, for example, the reference point transmitters 28, may be stored in the buffer S4 at block 90. Notationally, the correction inputs may be represented by the correction information matrix $\vec{C}$, which may include several vectors, including $\hat{p}$, $\hat{v}$ and $\hat{u}$ (where $\hat{u}$ is a vector of the yaw, pitch and roll Euler angles of the attitude $\vec{R}$). Also, as mentioned about, mode transition correction information from the current state estimator algorithm 86 may be stored in the buffer S4.

At step 92, a state estimate corrector algorithm computes a corrected state estimate of the object at time t=k−p−q based on the historical state information stored in buffer S2, inputs regarding when the last mode transition occurred (time $t_g^i$) from the buffer S3, and the correction information stored in buffer S4, where q is an additional delay representing the amount of time that passes between the arrival of correction information. The correction algorithm 92 may check to see whether any corrections have arrived in the buffer S4 and, if so, apply those corrections to the state estimates in the buffer S2 to generate corrected state estimates. For example, assume that at time $t_g^i$ correction information has arrived either (a) from the correction inputs 88 or (b) as a result of a mode transition detected by the current mode detector 82 and its resulting correction computed by the current mode state estimator 86 or (c) both (a) and (b). The corrector algorithm 92 may then compute and apply the corrections as it computes the state estimates in the buffer S2 for the time period $t_g^{i-1}$ to $t_g^i$. The state estimation at time t=k−p−q, where q is an additional delay to account for the corrected information, may then be supplied as the output of the high resolution state estimation algorithm. In this approach, $t_g^i - t_g^{i-1} < g$, such that the corrector algorithm 92 can work on all past states. Thereafter, the current mode state estimator 86 may use the new corrected state estimate as it computes the ongoing states estimates for the object.

A vector $\hat{g}$ of the correction history, e.g., a list of the last i time points where a state correction was provided (e.g., $\hat{g}=[t_g^1, t_g^2 \ldots, t_g^i]$), may be stored in the buffer S3 at block 94. The buffer S3 may also store a vector $\hat{h}$ of the mode history, e.g., a list of the last j time points where the mode of the object was switched (e.g., $\hat{h}=[t_m^1, t_m^2 \ldots, t_m^j]$). That is, when a change in the current mode is detected at step 82, the vector $\hat{h}$ stored in the buffer S3 at block 94 is updated.

In certain embodiments, the buffer S2 may store data at a slower rate than the other buffers. For example, the buffer S2 may store data at a rate of 1 Hz, whereas the other buffers may store data at a rate of 96 Hz. In that case, the buffer S2 stores every 96th value. As the buffer S2 outputs state estimation information, its time stamp may indicate the necessary fractional time stamp adjustment.

Figure 4:
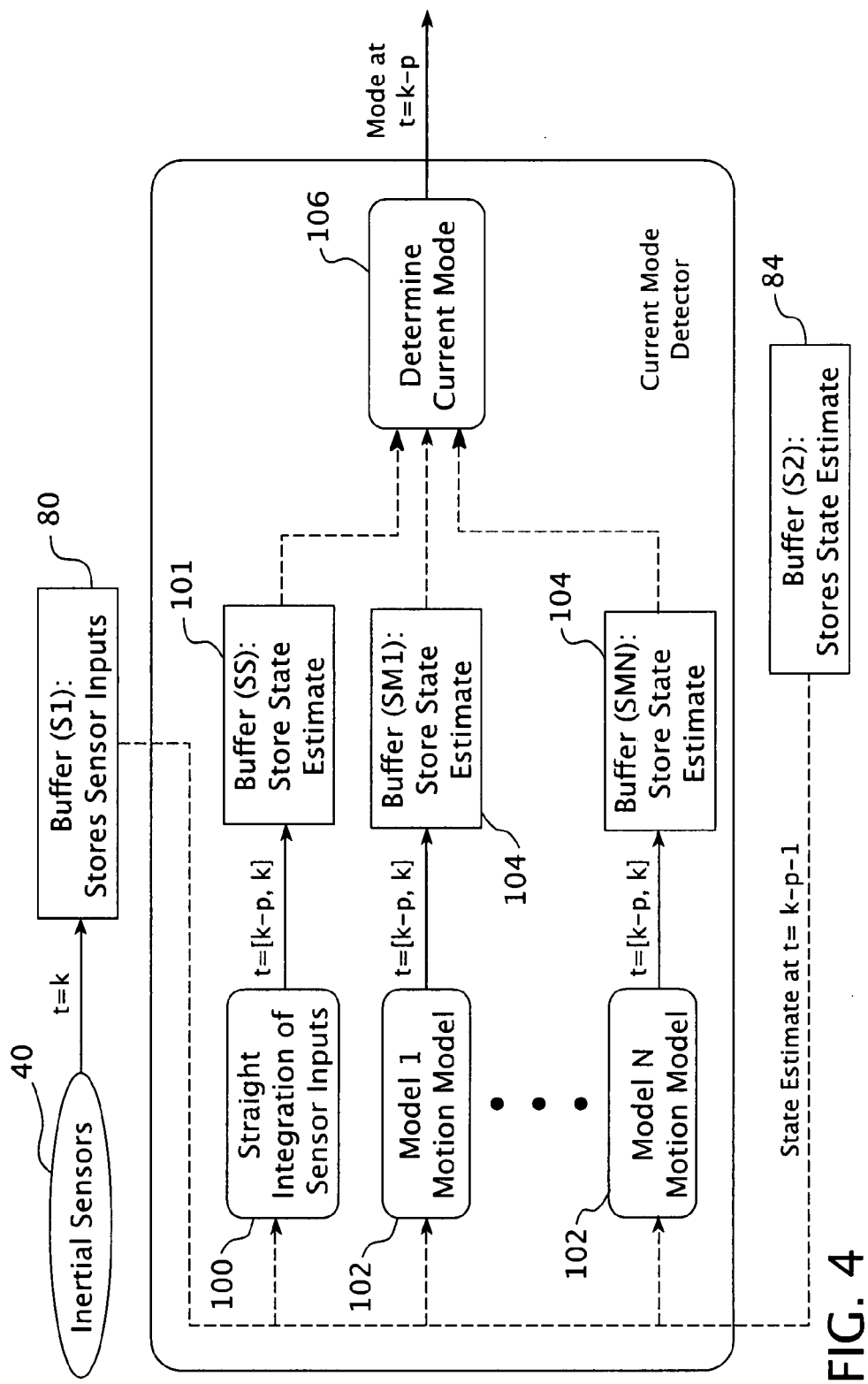

The process of the detecting the current mode of the object (step 82 of FIG. 3) may be a function of the various modes that the body (object) supports and the ease with which transitions between the modes can be detected. Typically, a conclusive decision that a mode transition detection is valid takes a period of time, p, to confirm the transition. For a body/object that has multiple modes, a generic process for detecting the current mode of the body/object according to various embodiments of the disclosed invention is shown in FIG. 4. At step 100, a straight integration is performed on the inertial sensor inputs (e.g., â and •) at time t=k and the state estimate at time t=k−p−1 (stored in the buffer S2, see FIG. 3) to arrive at a first state estimate for the time period t=[k−p, k]. The state estimate for the straight integration for this time period may be stored in a buffer (buffer SS) at block 101. Also, a number (N) of motion models 102 may be used to provide additional state estimate for the time period t=[k−p, k] based on the inertial sensor inputs at time t=k and the state estimate at time t=k−p−1, as described in more detail below. The state estimate for the various motion models may be stored in buffers (buffers SMI to SMN) at blocks 104. At step 106, the various state estimates for the time period t=[k−p, k] produced by the straight integration and the various motion models are analyzed and, based on the analysis, a final decision as to the mode at time t=k−p is made. According to various embodiments, a curve-fitting algorithm may be used to select the current mode.

A disadvantage of using a curve fitting algorithm is that to generate one time-increment of state estimation for each of the N motion models and the straight integration, (N+1)*p calculations must be performed, which may be too computationally expensive for some applications. To compensate, according to various embodiments, the current mode estimation can be performed at a lower frequency than the actual state estimation. In addition, if the probability of a mode transition is high, the resolution can be increased to better identify the transition time.

For bodies/objects with few motion modes or very distinct acceleration patterns, statistical analysis can also or alternatively be performed on the inertial sensor data to detect the current mode. For example, if the body is a car, which is either stationary or moving, statistical analysis of acceleration in the x direction may be sufficient to detect motion. For instance, the statistical analysis algorithm may analyze the standard deviation of a moving time window of the acceleration values. Changes in the standard deviation may be used to indicate mode transitions. The amount of time spent in the mode may then be used to ensure that the mode change detection was valid before a final decision is made that a mode transition has occurred.

Also, according to various embodiments, right after a transition it may be assumed that there are no other transitions for a time period, such as a fraction of p. During this time period, it may not be necessary to perform additional mode transition detection.

Figure 5:
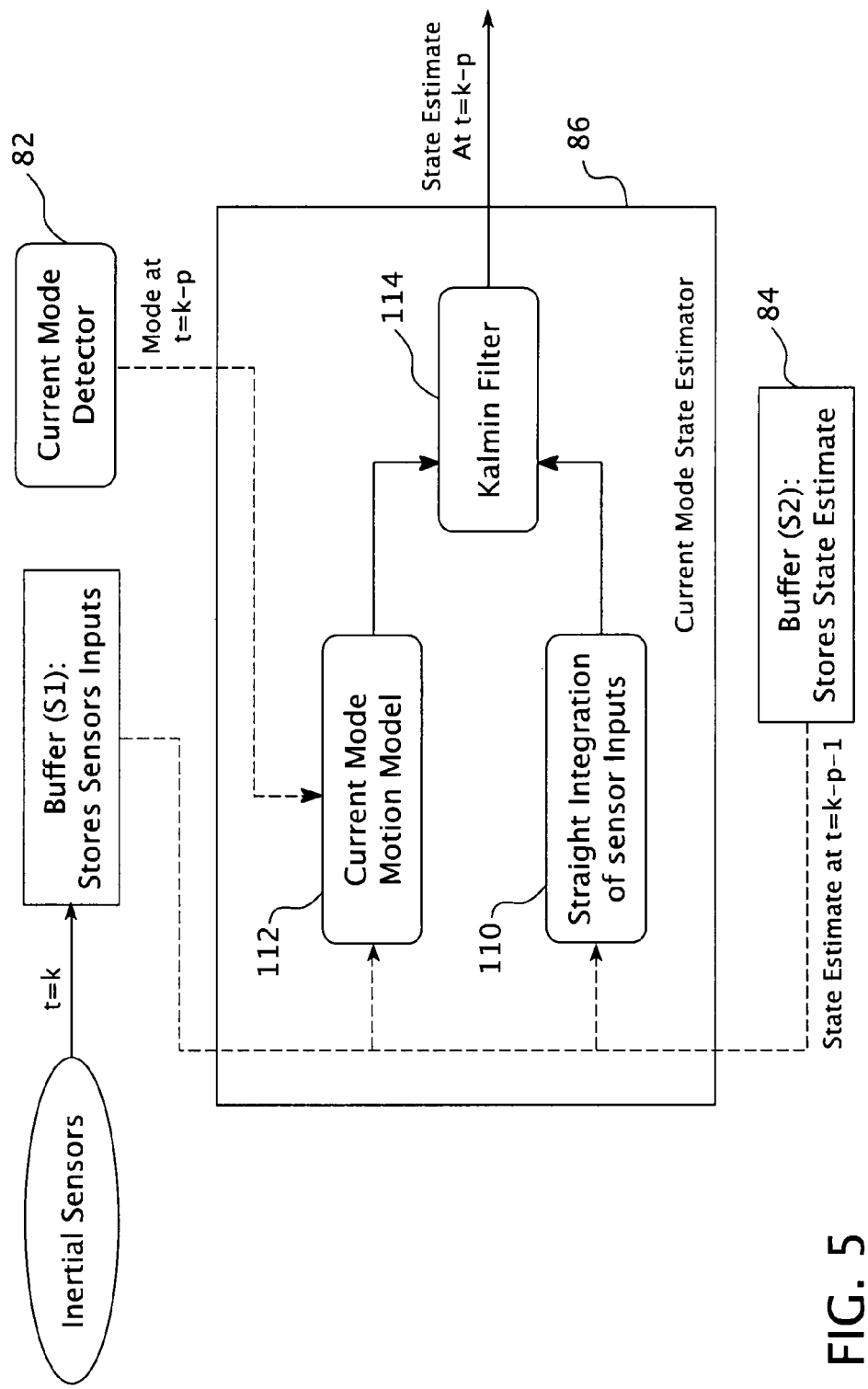

FIG. 5 is a diagram of the process of the current mode state estimator algorithm 86 for determining the current state estimate (the state estimate at time t=k−p) of the object according to various embodiments of the disclosed invention. At step 1 0, a straight integration is performed on the inertial sensor inputs (e.g., â and •) at time t=k and the state estimate at time t=k−p−1 (stored in the buffer S2, see FIG. 3) to arrive at a state estimate for the time period t=[k−p, k]. Alternatively, since the current mode detector algorithm 82 may perform this operation, the state estimate may be read from the buffer SS (see block 101, FIG. 4).

A current mode motion model 112 has a model for the allowed motion patterns for the object given the current motion mode, as determined by the current mode detector 82. For example, if the object is traveling in a car or other similar vehicle type in terms of allowed motions, the current mode motion model 112 may assume that the object cannot move in the body y direction. On the other hand, for example, if the object is being lifted by a forklift, the current mode motion model 112 may assume that the motion has to be in the z direction, and no motion may be expected in the x-y plane. Based on the allowed motion patterns for the given mode, the current mode motion model 112 computes a state estimate for the object at time t=k−p that is consistent with the motion model. A number of such motion models may be used for different motion types, with different assumptions for different modes as applicable. Because the actual state of the object is probably somewhere between the state estimates computed by the straight integration 110 and the current mode motion model 112, a Kalman filter 114, or some other suitable filtering technique, may take the two different state estimates and corresponding confidence factors (based on, e.g., known sensor noise and known model shortcomings) to compute a state estimate that is a weighted sum of the two state estimates. The Kalman filter 114 may be a standard Kalman filter or an adaptive one. According to various embodiments, a number of adaptive, cascaded Kalman filters may be used. The parameters of the filter(s) may be derived from noise characteristics of the inertial sensors, the accuracy of the current mode motion model 112 and other tuning.

The state estimate corrector algorithm 92 may correct the state estimates stored in the buffer S2 based on the corrective information stored in the buffer S4. The corrector algorithm 92 may differentiate between different types of corrective data in making corrections. For example, in various embodiments, the corrector algorithm 92 may differentiate between frequent and infrequent correction types. For infrequent corrections, such as when a position update is provided (such as from one of the reference position transmitters 28), the appropriate heading and/or velocity corrections that would shift the estimated position of the object to the updated position are computed. In making this determination, the initial heading information may be assumed to be incorrect and that the velocity error accumulated linearly. Once the heading and velocity corrections (and sometimes the bias corrections) are calculated, the results may be applied to correct the entire state trajectory in the buffer S2. In various embodiments, the corrector algorithm 92 may use a closed form solution to determine the heading and velocity corrections based on the estimated object location (without corrective inputs) and the updated object location.

The following describes one embodiment of how the state estimate corrector algorithm 92 may operate. Assume that a tracked object traverses a trajectory from an initial position $\hat{p}_0$ to a final position $\hat{p}_n$ over a period of T seconds. Let $v_0$ define the initial speed and let $\hat{h}_0$ define the initial speed heading in a navigation frame, i.e., a vector with unit magnitude, where $v_0 * \hat{h}_0$ would be the velocity in the navigation frame. Let the time interval T be divided into n sub increments, each of length dt (i.e., T=n*dt). Let $\hat{p}_i$, $v_i$ and $\hat{h}_i$ denote the position, speed, and speed heading, respectively, at time i*dt, and let $\hat{p}_n$, $v_n$ and $\hat{h}_n$ be the final position, speed, and speed heading. Further, assume that the final position is calculated as:

$$\hat{p}_n = \hat{p}_0 + \sum \left( \left( \hat{h}_i * v_i \right) * dt \right).$$

For simplicity, let $\hat{p}_n = 0$ in the following analysis.

Let $\hat{f}_i$ be a unit heading vector in the navigation frame at time i. Let $\vec{R}_i$ be the rotation matrix that maps from the inertial frame to the navigation frame. Assume that at time n, some correction information is given and its impact on the current state is to be calculated. Three types of error may be considered: (1) velocity estimation errors, (2) speed heading errors, and (3) accumulating velocity error.

For velocity estimation errors, the following types of velocity estimation errors should be accommodated while performing dead reckoning from the initial to the final position of an object:

The $v_0$ value may be wrong, and all $v_i$ need to be incremented by dv in some heading $\hat{f}_i$ in the navigation frame.

The estimate from $v_0$ to $v_n$ may be accumulating bias linearly, i.e., $v_i$ need to be incremented by i*dv in some heading $\hat{f}_i$.

The calculation from $v_0$ to $v_n$ may be accumulating bias with an arbitrary weight sequence and $v_i$ need to be incremented by $w_i$*dv in some heading $\hat{f}_i$.

It should be noted that first and second points are special cases of the third point. In the first situation $w_i=1$, and in the second situation $w_i=i$.

For cars or other similar vehicles, $\hat{f}_i$ is typically equal to $\hat{h}_i$ since the speed heading is typically in the body-x direction and there is minimal body-y or body-z speed to correct. As such each $\hat{f}_i$ is known and given at time i*dt. If one wants to accommodate error accumulation in all axes in the body frame, representing the three sensor biases, then $\hat{f}_i$ can be rewritten as $\hat{f}_i = \vec{R}_i * \hat{f}$, where $\hat{f}$ is a constant heading in the body frame, representing the error accumulation ratio in the body frame, and $\vec{R}_i$ is a rotation matrix, rotating the body frame to the navigation frame. Therefore, the position that accounts for the errors may be given as:

$$\hat{p}_c = \sum \left( \left( \hat{h}_i * v_i + \hat{f}_i * w_i * dv \right) * dt \right)$$
$$= dv * dt * \sum \left( w_i * \hat{f}_i \right) + \hat{p}_n$$
$$= dv * dt * \sum \left( w_i * \vec{R}_i \right) * \hat{f} + \hat{p}_n$$

Assume at time n a correction is obtained. The above equation can be used if the provided correction information is the correct position $\hat{p}_c$, in which case the correct values for dv and f̂ can be selected to make sure that the trajectory is shifted from $\hat{p}_n$ to $\hat{p}_c$, and the updated velocity may be computed at time n.

Alternatively the correction information may be a new velocity (i.e. dv and f̂) and the new position may be calculated. Let $$\hat{h}_a = \frac{\sum w_i * \hat{f}_i}{\sum w_i}$$

$$\vec{H}_b = \frac{\sum w_i * \vec{R}_i}{\sum w_i}.$$

The heading $\hat{h}_a$ and the rotation matrix $\vec{H}_b$ can be updated at each time increment and remembered as part of the system state. As such when at time n, a correction arrives, the correction can be applied without having to recalculate the state trajectory for t=[0,n]. Therefore, at any time n, one can either solve for f̂ and dv, or apply their impact.

Where the heading $\hat{h}_i$ values are wrong, they may be corrected by rotating them by an amount described by the rotation matrix $\vec{EH}_i$. If $\vec{EH}_i = \vec{EH}_0$, the error model may assume the initial heading was wrong. If it is desired to model some heading error accrual, it may be represented by a series of varying $\vec{EH}_i$. The new point may be given as:

$$\sum \left( \left( \vec{EH} * \hat{h}_i * v_i + \vec{EH} * \hat{f}_i * w_i * dv \right) * dt \right).$$

Here, the vectors $\hat{f}_i$ have been rotated as well, since the heading error typically represents the misalignment between body frame and navigation frame. But this term can be dropped depending on the needs of the model.

Because, for the general $\vec{EH}_i$, or even for small angle $\vec{EH}_i$, there is no immediate simplification that enables the heading error accumulation to be modeled and represented, it may be assumed that $\vec{EH}_i$ are all equal to $\vec{EH}$, which is equivalent to saying the initial heading was wrong. In this case the problem is simplified to:

$$\vec{EH} * \sum \left( \left( \hat{h}_i * v_i + \hat{f}_i * w_i * dv \right) * dt \right) =$$
$$\vec{EH} * \left( \hat{p}_n + dv * dt * \sum \left( w_i * \hat{f}_i \right) = \vec{EH} * \left( \hat{p}_n + dv * dt * \left( \sum w_i \right) * \hat{h}_a \right)$$

This equation can then be used at time n to accommodate the correction information obtained.

The last equation above applies to the case for a vehicle where the initial heading assumption was wrong and velocity error is accumulating. In this case, if a position update is provided and given a new point $\hat{p}_c$, this correction can be accommodated by selecting an $\vec{EH}$ to rotate $\hat{p}_n$ to a point $\hat{p}_r$ such that a translation from $\hat{p}_r$ in the direction $\vec{EH}*\hat{h}_a$ leads to $\hat{p}_c$. The amount of translation to $\hat{p}_c$ is adjusted by proper selection of the dv value. Alternatively, one could first translate $\hat{p}_n$ to a point $\hat{p}_t$ along $\hat{h}_a$ such that $\hat{p}_t$ can then be rotated to $\hat{p}_c$ by picking $\vec{EH}$. If given a velocity correction, the other unknowns can be solved for.

Figure 7:
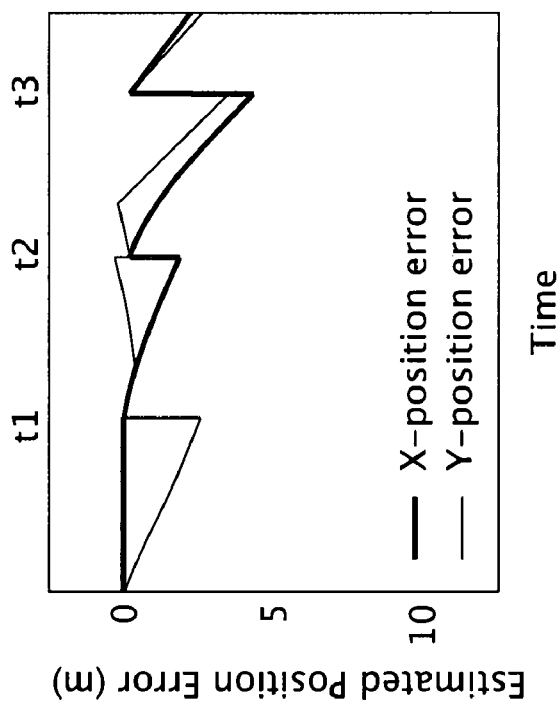
FIGS. 6 and 7 provide an example of how information from the wireless aiding system may be utilized in computing the state estimate of a tracked object according to various embodiments of the disclosed invention.
Figure 6:
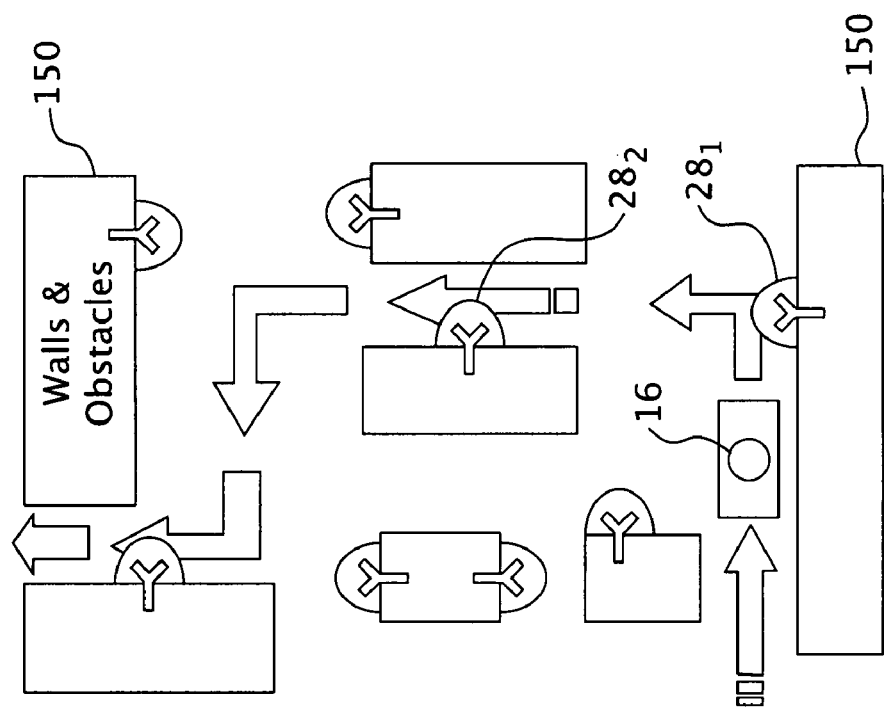

FIGS. 6 and 7 provide a simplified example of how the reference position transmitters 28 may be used to correct/update the position of the object in the high-resolution mode. FIG. 6 is a simplified diagram of a high-resolution area 14 with walls/obstacles 150 situated throughout the environment. FIG. 7 shows the x- and y-position error in the calculated position of the object/tracking device 16 as a function of time as it moves throughout the environment. As can be seen in this example, when the object/tracking device 16 reaches the first reference position transmitter $28_1$ at time t1, the position of the object/tracking device 16 is updated/corrected such that the x and y errors are zero at time t1. As the object/tracking device 16 continues to move throughout the environment, errors accumulate in both the x and y directions until the object/tracking device 16 reaches the second reference position transmitter $28_2$ at time t2, at which time the position of the object/tracking device 16 is updated/corrected, and so on as the object/tracking device 16 moves throughout the environment.

The host processing system 18 may have knowledge (stored in the database 24, for example) about physical constraints of the environment and make additional position refinements based on that information. For example, the host processing system 18 may know the location of certain walls or other permanently located obstacles in the environment and, based thereon, refine the reported position of an object if the reported position coincides with such a wall or obstacle. Also, for certain object types, the host processing system 18 may assume that no two objects are in the same position at the same time.

Figure 8:
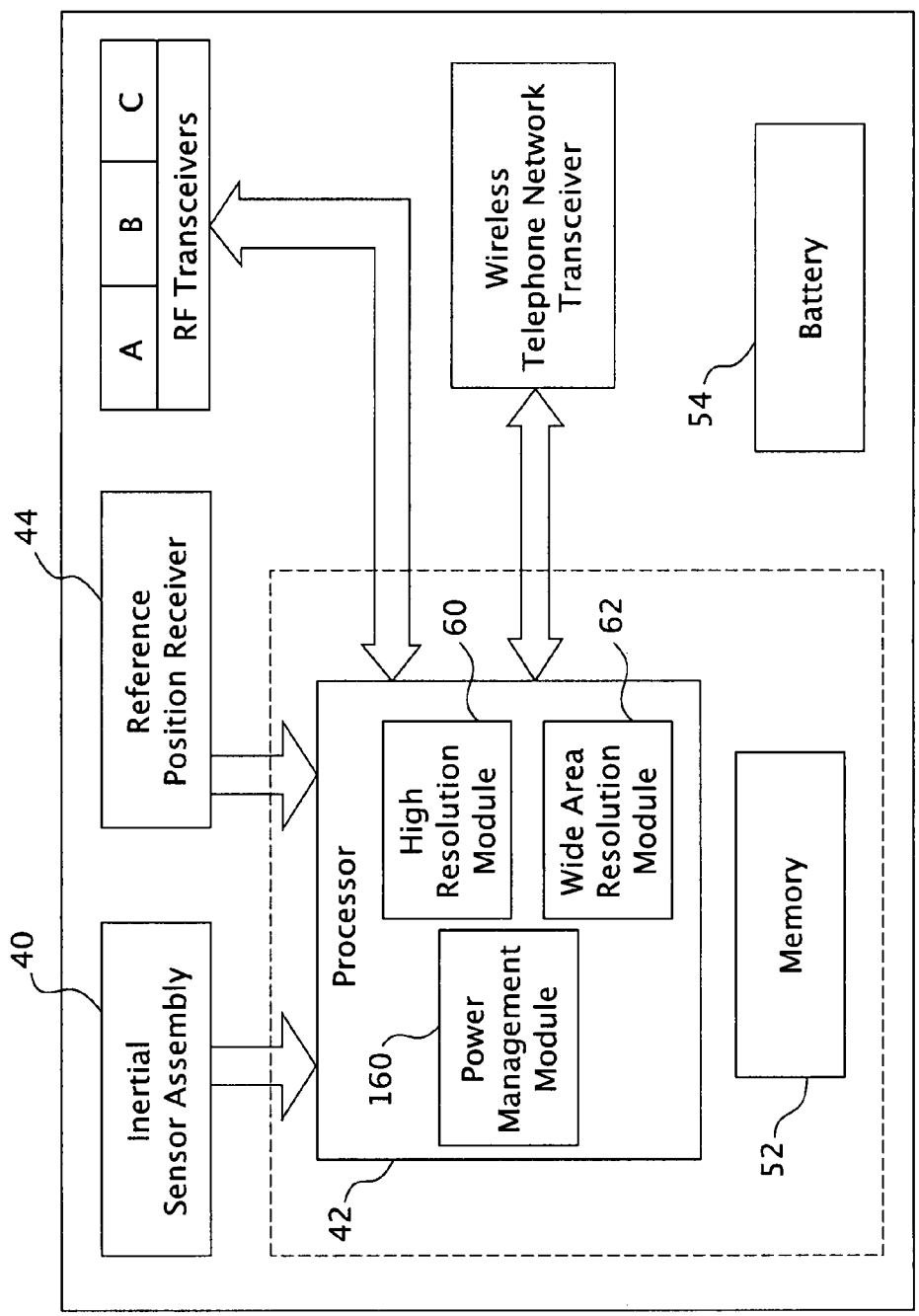
FIG. 8 is a diagram of the tracking device according to other embodiments of the disclosed invention.

FIG. 8 is a diagram of the tracking device 16 according to another embodiment of the disclosed invention. As shown in FIG. 8, in this embodiment the tracking device 16 additionally includes a power management module 160. The power management module 160 may be implemented as software code to be executed by the processor 42 using any suitable computer instruction type such as, for example, Java, C, C++, Visual Basic, etc., using, for example, conventional or object-oriented techniques. The software code may be stored as a series of instructions or commands on a computer readable medium, such as a memory device 52.

According to various embodiments, the power management module 160 may receive the inputs from the inertial sensor assembly 40 and, based thereon, determine an appropriate power level for the tracking device 16 (such as, e.g., full power, reduced duty cycle, hibernation or sleep mode) that is needed for proper operation of the tracking device 16 at that particular moment. For example, according to one embodiment, for a position tracking system 10 where continuous position sensing and computation of the tracking device 16 is only needed when the object under surveillance is in motion, the power management module 160 can, for example, cause the processor 42 to enter a sleep mode if no (or minimal) movement is detected for a certain time period.

Also, for example, the power management module 160 may select a reduced duty cycle mode when the tracking device 16 is in the wide area resolution mode and select a full power mode when the tracking device 16 is in the high resolution mode (except when the processor 42 enters the sleep mode due to lack of movement, for example, regardless of operational mode). Although this description of the power management module 160 is in the context of a tracking device with an on-board processor, such a power management module that is responsive to inertial sensor inputs in selecting the power level can be used for any device with an on-board processor.

Figure 9:
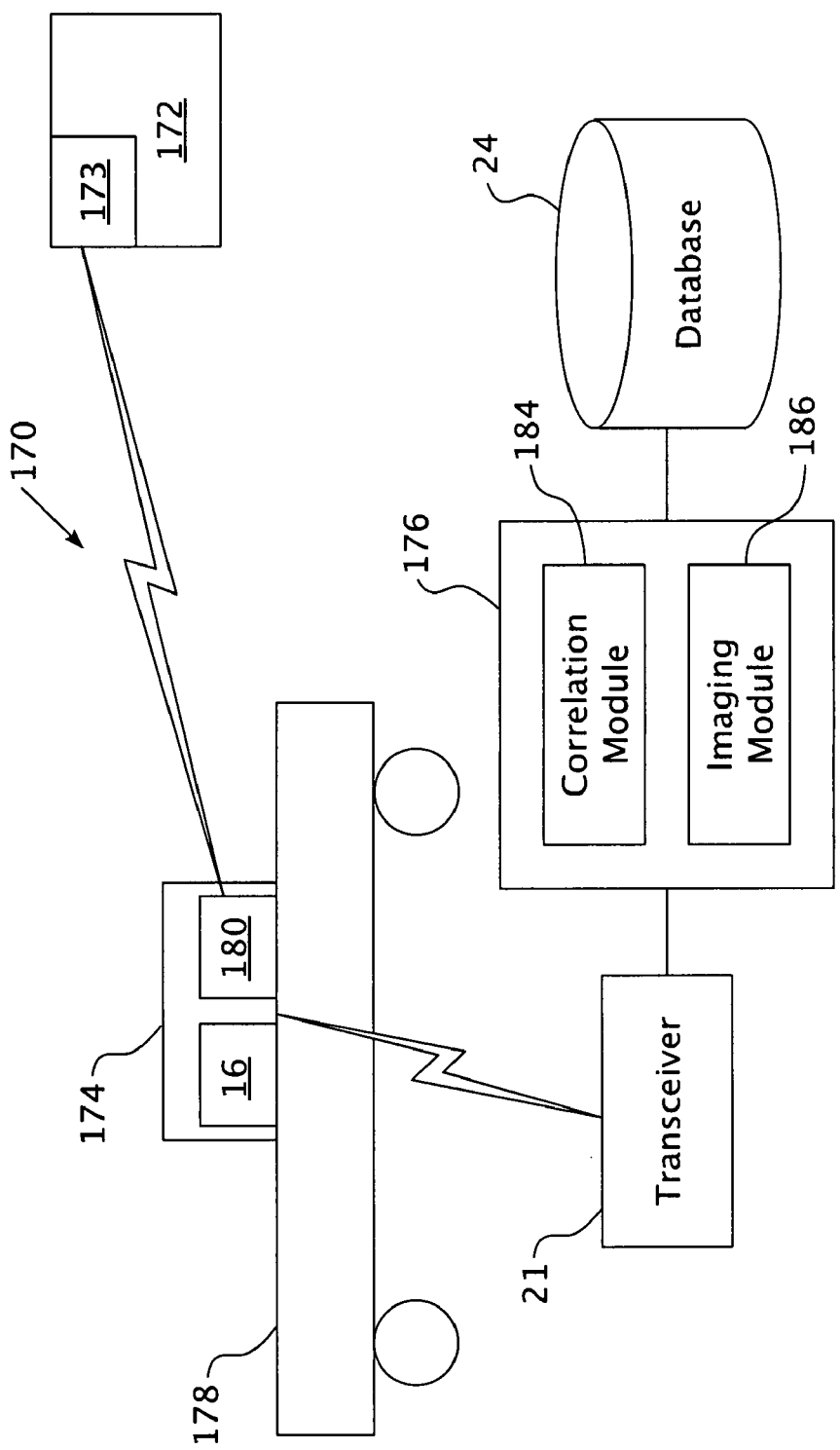
FIG. 9 illustrates various embodiments of a system for determining a location of an object.

In other embodiments, the position-tracking device 16 could be mounted on, attached to, or otherwise carried by a mobile vehicle and used to determine the position of objects located throughout an environment as the mobile vehicle moves throughout the environment. FIG. 9 illustrates a system 170 according to such an embodiment for determining the location of an object 172. The system 170 may be utilized to track the respective locations of any number of objects 172, although only one such object is shown in FIG. 9 for purposes of simplicity. The system 170 includes an object location tracker 174 and a computer system 176 in wireless communication with the object location tracker 174. The object location tracker 174 is for attachment to a vehicle 178 and comprises an object identification reading device 180 and the position-tracking device 16. The vehicle 178 may be any type of vehicle capable of movement. For example, according to various embodiments, the vehicle 178 may be a pushcart such as a book cart or a shopping cart. According to other embodiments, the vehicle 178 may be a motorized vehicle such as a car, a truck, a forklift, etc. According to other embodiments, the vehicle 178 may be an autonomous robot. According to yet other embodiments, the mobile vehicle may be a person who is walking around the environment. Although only one object location tracker 174 is shown in FIG. 9, the system 170 may utilize a plurality of object location trackers 174, with each respective object location tracker 174 attached to a different vehicle 178.

The object identification reading device 180 is for sensing object identification indicia 173 on the object 172. The object identification indicia 173 may be embodied, for example, in the form of a radio frequency identification (RF ID) tag on the object 172, a bar code on the object 172, a character such as a letter, a numeral, a symbol, etc. on the object 172, or any combination thereof on the object 172. Correspondingly, the object identification reading device 180 may include, for example, a radio frequency identification reader for sensing a RF ID tag on the object 172, a bar code scanner for reading a bar code on the object 172, a camera with optical character recognition (OCR) for recognizing characters on the object 172, etc. or any combination thereof.

Although only one reading device 180 is shown attached to the vehicle 178 in FIG. 9, it should be recognized that in other embodiments the vehicle 178 may carry multiple reading devices with different coverage areas. For example, if the device 174 was being used to locate books in a library, the device 174 may have a reading device 180 for each shelf height. In such an embodiment, for example, the device 174 may include a rod with an RFID reader antenna sticking out for each shelf height. Also, the device 174 may include different types of reading devices 180, such as a barcode scanner and an RFID reader, etc.

In addition, where the environment includes a number of objects with fixed positions, the identification indicia read from those fixed-position objects by the reading device(s) 180 can be used to aid in the location determination process much like a reference position signal received from one of the reference position signal transmitters 28. In other words, if the reading device 180 reads an object with fixed known location, the position tracking device 16 can use that information to aid in the location determination process.

The position-tracking device 16 may be as described above. For example, with reference to FIG. 2, the position-tracking device 16 may include an inertial sensor assembly 40, a processor 42, a reference position receiver 44, a number of RF transceivers 46A-C, a wireless telephone network transceiver 48, a memory device 52 and a power source 54. The position-tracking device 16 may also include a high resolution module for computing the location of the object location tracker 174 (and hence the mobile vehicle to which the tracker 174 is attached) when the system 170 is in a high resolution operation mode, and a wide area resolution module for computing the location of the object location tracker 174 when the system 170 is in a wide area resolution mode. According to various other embodiments, the position-tracking device 16 may utilize GPS receiver for tracking it location. In other embodiments, as discussed above, the position-tracking device 16 may use a combination of a GPS receiver and the inertial sensor technique described in more detail above.

The position tracking device 16 may interpolate between reference points in determining its position. As described above, a time trajectory between the two reference positions may be computed by the high resolution module 60 (see FIG. 2) based on the detected motion modes of the mobile vehicle, Kalman filtering, etc. That way, the location of the tracking device 16 between the reference points where the identification indicia of the object was read may be determined.

The computer system 176 is in communication with the object location tracker 174 and may be similar to the host computer 18 described hereinabove. The sensed object identification indicia and the updated location information of the object location tracker 174 are transmitted wirelessly to the computer system 176. The facility does not need to provide ubiquitous wireless communication coverage. Wireless coverage in a small area may be enough so long as the vehicle 178 passes through this coverage area at satisfactory intervals.

The computer system 176 may include a correlation module 184 for associating the sensed object identification indicia 173 of the object 172, as determined by the reading device 180, with a location in the environment based on the position of the object location tracker 174 in the environment, as determined by the position-tracking device 16, when the object identification reading device 180 senses the object identification indicia 173. In addition, as the vehicle 178 moves throughout an environment and/or as the correlation module 180 receives object location data from other vehicles 178, the correlation module 180 may update and filter the received object location information to obtain near real-time object location information for the objects in the environment. Further, since the computer system 176 can receive information from multiple tracking devices 174 each moving in the environment, the correlation module 180 can use the redundant location information from the multiple trackers 174 to refine the location of the objects. The object location information may be stored in the database 54 and/or used by other logistics systems, as described above.

The computer system 176 may also include an imaging module 186 for generating a representation of the environment and the locations of each tracked object 172 in the environment. The representation may be, for example, printed, or displayed on a monitor to show the location of each tracked object 172 in an environment.

The correlation module 184 and the imaging module 184 may be implemented as software code to be executed by the computer system 176 using any suitable computer instruction type. The software code may be stored as a series of instructions or commands on a computer readable medium.

A system 170 as described above may be used, for example, to track the location of and identify inventory in the environment. For example, the object-tracking device 170 could be attached to a book return pushcart for use in a library to track the location of books in the library that have, for example, RF ID tags or bar codes that can be sensed by the reading device 180. Similarly, the object-tracking device 170 could be attached to shopping cart for use in a retail store (such as a grocery store) to track the location of inventory in the store. Also, the object-tracking device 170 could be attached to a forklift or other type of industrial vehicle for use in a warehouse or transportation yard to track the location of inventory or other goods. In yet other application, the object-tracking device 170 could be attached to vehicle that roams around a parking lot to track the location of cars or other vehicles in the parking lot that have, for example, RF ID tags or bar codes that can be sensed by the reading device 180.

While several embodiments of the invention have been described, it should be apparent, however, that various modifications, alterations and adaptations to those embodiments may occur to persons skilled in the art with the attainment of some or all of the advantages of the invention. It is therefore intended to cover all such modifications, alterations and adaptations without departing from the scope and spirit of the present invention as defined by the appended claims.

What is claimed is:

1. A system for determining a location of an object, the system comprising:
   an object location tracker for attachment to a mobile vehicle, the object location tracker comprising:
   an object identification reading device for sensing object identification indicia on the object; and
   a position-tracking device for determining a location of the object location tracker as the mobile vehicle moves throughout an environment; and
   a computer system in communication with the object location tracker for associating the sensed object identification indicia of the object with a location in the environment based on the position of the object location tracker in the environment as determined by the position-tracking device when the object identification reading device senses the object identification indicia,
   wherein the position-tracking device of the object location tracker comprises:
   an inertial sensor assembly;
   a reference position receiver; and
   a high resolution module in communication with the inertial sensor assembly and the reference position receiver, wherein the high resolution module is for computing the location of the object location tracker in real-time based on a combination of input from the inertial sensor assembly and a reference position signal received by the reference position receiver when the object location tracker is located in a first area requiring high position resolution, wherein the high resolution module is for computing the location of the object by:
   detecting a current mode of movement for the object location tracker based on the input from the inertial sensor assembly and historical information about the location of the object location tracker;
   determining a first estimated position of the object location tracker based at least on a motion model for the current mode of movement for the object location tracker;
   determining a second estimated position of mobile object based on the input from the inertial sensor assembly and the historical information about the location of the object location tracker; and
   estimating a real-time location of the object location tracker based on the first and second estimated positions.

2. The system of claim 1, wherein the object identification reading device includes a radio frequency identification reader for sensing a radio frequency identification tag on the object.

3. The system of claim 1, wherein the object identification reading device includes a bar code scanner for reading a bar code on the object.

4. The system of claim 1, wherein the object identification reading device includes a camera for recognizing a character on the object.

5. The system of claim 1, wherein the position-tracking device further comprises a global positioning system receiver.

6. The position tracking device of claim 1, wherein the high resolution module is for estimating the real-time location of the mobile vehicle based on the first and second estimated positions using a Kalman filter.

7. The system of claim 6, wherein the high resolution module is further for correcting the historical information about the location of the mobile vehicle based on corrective information.

8. The system of claim 7, wherein the corrective information includes the reference position signal.

9. The system of claim 8, wherein the corrective information includes detection of a transition in the mode of movement by the mobile vehicle.

10. The system of claim 1, wherein the high resolution module is for computing the location of the mobile vehicle by computing a time trajectory between two reference position locations.

11. The system of claim 1, wherein the position-tracking device further comprises a wide area resolution module for computing the position of the mobile vehicle when the mobile vehicle is located in an area requiring lesser position resolution.

12. The system of claim 1, wherein the object location tracker comprises a plurality of object identification reading devices.

13. The system of claim 1, further comprising a plurality of object location trackers, each object location tracker including an object identification reading device and a position-tracking device, and wherein the computer system is for communicating with each of the object location trackers and refines the location of the object based on the received data from the plurality of object location trackers.

14. A system for determining a location of an object, the system comprising:
   a vehicle;
   an object location tracker attached to the vehicle, the object location tracker comprising:
   an object identification reading device for sensing object identification indicia on the object; and a position-tracking device for determining a location of the object location tracker as the vehicle moves throughout an environment; and a computer system in communication with the object location tracker for associating the sensed object identification indicia of the object with a location in the environment based on the position of the object location tracker in the environment as determined by the position-tracking device when the object identification reading device senses the object identification indicia, wherein the position-tracking device of the object location tracker comprises:

an inertial sensor assembly;

a reference position receiver; and a high resolution module in communication with the inertial sensor assembly and the reference position receiver, wherein the high resolution module is for computing the location of the object location tracker in real-time based on a combination of input from the inertial sensor assembly and a reference position signal received by the reference position receiver when the object location tracker is located in a first area requiring high position resolution, wherein the high resolution module is for computing the location of the object by:

detecting a current mode of movement for the object location tracker based on the input from the inertial sensor assembly and historical information about the location of the object location tracker;

determining a first estimated position of the object location tracker based at least on a motion model for the current mode of movement for the object location tracker;

determining a second estimated position of mobile object based on the input from the inertial sensor assembly and the historical information about the location of the object location tracker; and estimating a real-time location of the object location tracker based on the first and second estimated positions.

15. The system of claim 14, wherein the vehicle comprises a cart.

16. The system of claim 14, wherein the vehicle comprises a motorized vehicle.

17. The system of claim 14, wherein the vehicle comprises a person.

18. A method for determining a location of an object, the method comprising: sensing object identification indicia on the object from a mobile vehicle as the mobile vehicle moves in an environment in which the object is located;

detecting the position of the mobile vehicle in the environment by:

detecting movement of the mobile vehicle with an inertial sensor assembly; determining a current mode of movement of the vehicle based on the detected movement and state estimates for the vehicle for prior instances in time;

determining a first state estimate of the vehicle based at least on a motion model for the current mode of movement of the vehicle;

determining a second state estimate of the vehicle by dead reckoning based on movement of the vehicle detected by the inertial sensor assembly and the state estimates for the vehicle for the prior instances in time; and determining a near real-time state estimate for the vehicle based on the first and second state estimates; and associating the sensed object identification indicia of the object with a location in the environment based on the state estimate of the vehicle when the object identification indicia of the object is sensed.

19. The method of claim 18, wherein sensing object identification indicia includes sensing a radio frequency identification tag on the object.

20. The method of claim 18, wherein identifying the object includes reading a bar code on the object.

21. The method of claim 18, wherein identifying the object includes reading a character on the object.

22. The method of claim 18, further comprising generating a representation of the environment including an indication of the location of the object in the environment.

23. The method of claim 18, further comprising computing a time trajectory between two reference position locations.

* * * * *